United States Patent
Jung

(10) Patent No.: US 9,081,541 B2
(45) Date of Patent: Jul. 14, 2015

(54) MOBILE TERMINAL AND METHOD FOR CONTROLLING OPERATION THEREOF

(75) Inventor: Hotaek Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 13/365,411

(22) Filed: Feb. 3, 2012

(65) Prior Publication Data

US 2013/0065614 A1    Mar. 14, 2013

(30) Foreign Application Priority Data

Sep. 14, 2011   (KR) .................. 10-2011-0092689

(51) Int. Cl.
*H04M 1/00* (2006.01)
*H04B 1/38* (2006.01)
*G06F 1/16* (2006.01)
*G06F 3/0484* (2013.01)
*H04M 1/725* (2006.01)
*G06F 3/044* (2006.01)

(52) U.S. Cl.
CPC .............. *G06F 1/1626* (2013.01); *G06F 3/044* (2013.01); *G06F 3/04845* (2013.01); *H04M 1/72522* (2013.01); *G06F 2200/1614* (2013.01); *G09G 2340/0492* (2013.01); *H04M 2250/12* (2013.01); *H04M 2250/52* (2013.01)

(58) Field of Classification Search
CPC . G06F 3/0482; G06F 3/0484; G06F 3/04845; G06F 3/04847; H04M 1/72519; H04M 1/72512
USPC ........... 455/566; 345/619, 649–659, 173, 176
See application file for complete search history.

(56) References Cited

U.S. PATENT DOCUMENTS

| | | | | |
|---|---|---|---|---|
| 6,697,083 | B1* | 2/2004 | Yoon | 345/658 |
| 8,111,247 | B2* | 2/2012 | Thorn | 345/173 |
| 8,634,871 | B2* | 1/2014 | Mitsunaga | 455/556.1 |
| 8,957,919 | B2* | 2/2015 | Han et al. | 345/659 |
| 2007/0160222 | A1* | 7/2007 | Trepte | 381/61 |
| 2009/0239579 | A1 | 9/2009 | Lee et al. | |
| 2009/0295832 | A1 | 12/2009 | Takatsuka et al. | |
| 2009/0295943 | A1* | 12/2009 | Kim et al. | 348/231.99 |
| 2009/0298548 | A1* | 12/2009 | Kim et al. | 455/566 |
| 2010/0040217 | A1* | 2/2010 | Aberg et al. | 379/202.01 |
| 2010/0060548 | A1* | 3/2010 | Choi et al. | 345/1.3 |
| 2010/0238109 | A1* | 9/2010 | Cook et al. | 345/156 |
| 2010/0277421 | A1* | 11/2010 | Charlier et al. | 345/173 |
| 2011/0032220 | A1* | 2/2011 | Shih et al. | 345/204 |
| 2011/0076003 | A1* | 3/2011 | Cho et al. | 396/297 |
| 2011/0084893 | A1 | 4/2011 | Lee et al. | |
| 2011/0164047 | A1* | 7/2011 | Pance | 345/581 |

(Continued)

FOREIGN PATENT DOCUMENTS

| | | | |
|---|---|---|---|
| JP | 2009-294728 A | 12/2009 | |
| KR | 10-2009-0101733 A | 9/2009 | |

(Continued)

*Primary Examiner* — Magdi Elhag
(74) *Attorney, Agent, or Firm* — Birch, Stewart, Kolasch & Birch, LLP

(57) ABSTRACT

Discussed are embodiments that provide an interface which is intuitional to users in a mobile terminal having a transparent display. In an exemplary embodiment, there is a mobile terminal that includes: a sensing unit configured to detect a user's direction with respect to the mobile terminal; a transparent display unit configured to display an image; and a controller configured to control the transparent display unit to change a display direction of the image.

12 Claims, 12 Drawing Sheets

(56) References Cited

U.S. PATENT DOCUMENTS

| | | | |
|---|---|---|---|
| 2011/0249078 A1* | 10/2011 | Abuan et al. | 348/14.02 |
| 2012/0079421 A1* | 3/2012 | Arriola | 715/784 |
| 2012/0218263 A1* | 8/2012 | Meier et al. | 345/419 |

FOREIGN PATENT DOCUMENTS

| | | |
|---|---|---|
| KR | 10-2009-0128254 A | 12/2009 |
| KR | 10-2011-0038980 A | 4/2011 |

* cited by examiner

MOBILE TERMINAL AND METHOD FOR CONTROLLING OPERATION THEREOF

CROSS REFERENCE TO RELATED APPLICATIONS

The present application claims priority to Korean Application No. 10-2011-0092689 filed in Korea on Sep. 14, 2011, the entire contents of which is hereby incorporated by reference in its entirety.

BACKGROUND OF THE INVENTION

1. Field of the Invention

The present invention relates to a mobile terminal and, more particularly, to a mobile terminal having a transparent display.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components which form the mobile terminal.

SUMMARY OF THE INVENTION

An aspect of the present invention provides an interface which is intuitional to users in a mobile terminal having a transparent display.

According to an aspect of the present invention, there is provided a mobile terminal including: a sensing unit configured to detect a user's direction with respect to the mobile terminal; a transparent display unit configured to display an image; and a controller configured to control the transparent display unit to change a display direction of the image.

According to another aspect of the present invention, there is provided a method for controlling an operation of a mobile terminal having a transparent display unit, including: detecting a user's direction with respect to the mobile terminal; and controlling the transparent display unit to change a display direction of an image based on the detected direction.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Hereinafter, embodiments will be described in detail with reference to the accompanying drawings such that they can be easily practiced by those skilled in the art to which the present invention pertains. As those skilled in the art would realize, the described embodiments may be modified in various different ways, all without departing from the spirit or scope of the present invention. In order to clarify the present invention, parts irrespective of description will be omitted, and similar drawing sequences are used for the similar parts throughout the specification.

The mobile terminal described in the present disclosure may include mobile phones, smart phones, notebook computers, digital broadcast terminals, PDAs (Personal Digital Assistants), PMPs (Portable Multimedia Player), navigation devices, and the like. It would be understood by a skilled person in the art that the configuration according to the embodiments of the present invention can be also applicable to the fixed types of terminals such as digital TVs, desk top computers, or the like, except for any elements especially configured for a mobile purpose.

Figure 1:
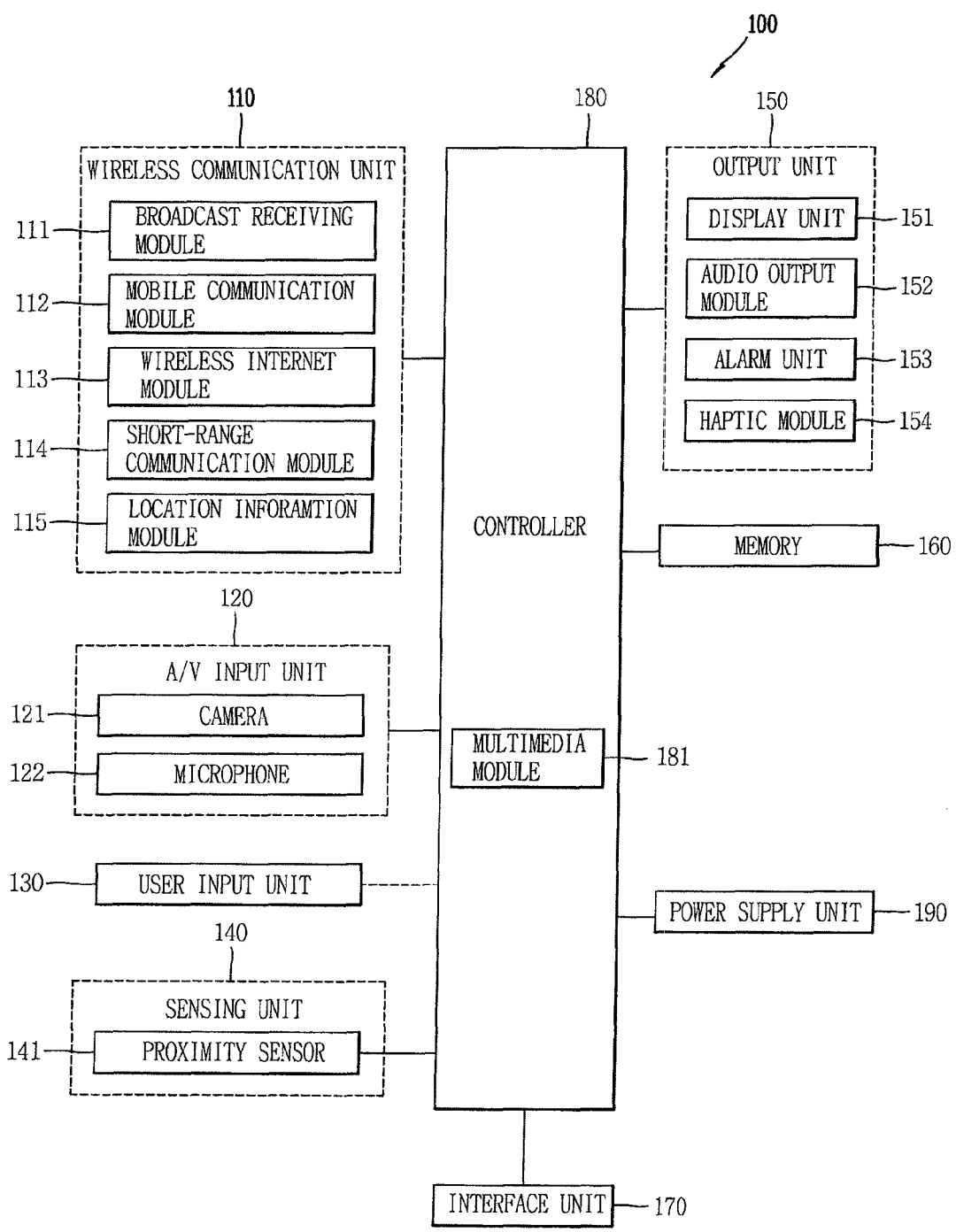
FIG. 1 is a schematic block diagram of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal as having various components, but it should be understood that implementing all of the illustrated components is not a requirement. Greater or fewer components may alternatively be implemented.

FIG. 1 is a block diagram illustrating a mobile terminal 100 associated with an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a global positioning system (GPS) module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170.

The sensing unit 140 may include a proximity sensor 141. Furthermore, the sensing unit 140 may include a touch sensor for sensing a touch operation to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the display unit 151 and the touch sensor have a layered structure therebetween, the display unit 151 may be used as an input device rather than an output device. The display unit 151 may be referred to as a "touch screen".

When there is a touch input through the touch screen, the corresponding signals are sent to a touch controller (not shown). The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized into a proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper portion and lower portion of the display unit, respectively. The output window and the input window may be regions allocated to output or input information, respectively. A soft key on which numerals for inputting phone numbers or the like are displayed is outputted on the input window. When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with a case where the display unit 151 and the touch pad are touched together within a predetermined period of time, one function of the mobile terminal 100 may be executed. As a case of being touched together, there is a case when the user clamps a terminal body of the mobile terminal 100 using the thumb and forefinger. For one of the functions executed in the mobile terminal 100, there may be an activation or de-activation for the display unit 151 or the touch pad.

Meanwhile, the sensing unit 140 according to embodiments of the present invention detects a user's direction with respect to the mobile terminal. To this end, the sensing unit 140 may include at least one of an acceleration sensor, a gyro sensor, and a geomagnetic sensor. Also, the display unit 151 includes a transparent display and displays an image through the transparent display. Also, the controller 180 may control the display unit 151 to change a display direction of an image based on the direction detected by the sensing unit 140. The controller 180 may set a user interface based on the changed display direction.

In a first embodiment of the present invention, the controller 180 may control the display unit 151 to reverse the image horizontally and/or vertically based on the display direction. Accordingly, when the user, who is currently viewing a front surface of the mobile terminal 100, reverses the mobile terminal 100 to see the rear surface thereof, the image is reversed to be displayed on the rear surface, so the user can continue to view the same image.

In a second embodiment of the present invention, the mobile terminal 100 may include one camera 121 on a front surface or a rear surface of the body (i.e., housing or case) of the mobile terminal 100, and the controller 180 may set a user interface in relation to the camera based on the display direction. For example, the controller 180 may selectively display a menu provided in a mode (general image capture mode) in which an image of a subject, other than the user, is captured and a menu provided in a mode (self-image capture mode or self portrait mode) in which an image of the user is captured, based on a display direction. Accordingly, the general image capture mode and the self-image capture mode can be smoothly interchanged by using the single camera on the transparent display.

In a third embodiment of the present invention, the mobile terminal 100 may include cameras 121 on both of front and rear surfaces of the body (i.e., housing or case), and the controller 180 may control the display unit 151 to selectively display images respectively captured by the plurality of cameras 121 based on a display direction. For example, when the user turns the mobile terminal over in the self-image capture mode using the camera provided on the front surface, the mobile terminal 100 may be changed into the self-image capture mode using the camera provided on the rear surface, to thus continuously maintain the original self-image capture mode. Also, in order for the mobile terminal 100 to determine a camera the user actually wants to use to capture an image, among the plurality of cameras, when a camera capturing an image whose brightness is lower than a threshold value, among the plurality of cameras, the corresponding camera may be deactivated or an image captured by a different camera may be displayed on the display unit 151.

In a fourth embodiment of the present invention, the controller 180 may selectively display images regarding a plurality of applications being executed based on a display direction. For example, the controller 180 may display an image regarding an application being executed in the foreground through a display plane determined to be viewed by the user, and when the user turns the mobile terminal 100 over, the controller 180 may display an image regarding an application being executed in the background. Here, the application being executed in the foreground may be a call application, and the application being executed in the background may be an application other than the call application. Accordingly, the utilization of multitasking function can be enhanced, and in particular, the user can use a required application regardless of the screen during a call communication.

In a fifth embodiment of the present invention, the mobile terminal 100 may include audio output modules 152 on both of the front and rear surfaces of the body, and the controller 180 may selectively activate the plurality of audio output modules 152 based on a display direction. When the user of the mobile terminal 100 simultaneously performs call communication with first and second counterparts, an image related to the call with the first counterpart may be displayed on the front surface of the mobile terminal 100, and when the user turns the mobile terminal over 100, an image related to the call with the second counterpart may be displayed on the rear surface of the mobile terminal. Also, the audio output module 152 related to the corresponding displayed image may be activated and a voice from a terminal of a corresponding counterpart may be received and output, whereby the user can smoothly perform call communication with two or more counterparts simultaneously.

In a sixth embodiment of the present invention, the user input unit 130 may include a touch detection unit provided on only any one of the front and rear surfaces of the body, and when a touch input with respect to an image displayed on the side not providing a touch detection unit is detected, the user input unit 130 may convert coordinates of the detected touch input and provide an accurate touch input interface.

Figure 2:
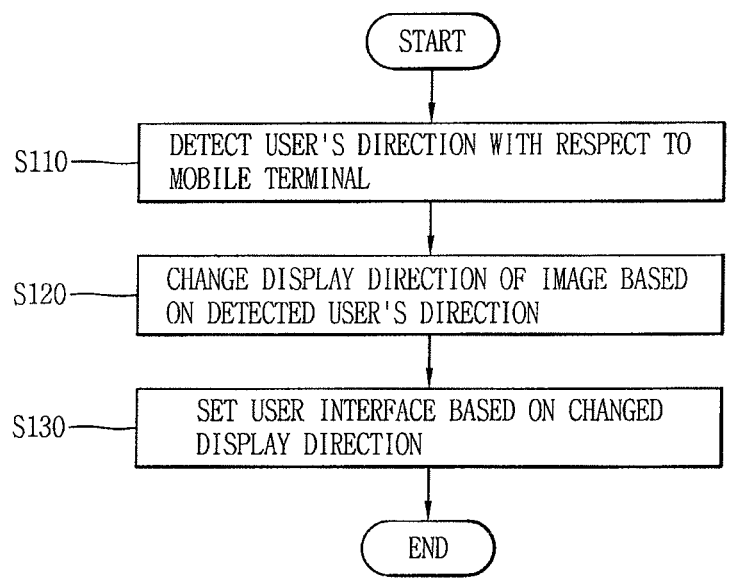
FIG. 2 is a flow chart illustrating a process of a method for controlling an operation of the mobile terminal according to an embodiment of the present invention.

FIG. 2 is a flow chart illustrating a process of a method for controlling an operation of the mobile terminal according to an embodiment of the present invention. With reference to FIG. 2, a method for controlling an operation of the mobile terminal 100 include: step (S110) of detecting a user's direction with respect to a mobile terminal; step (S120) of changing a display direction of an image based on the detected user's direction; and step (S130) of setting a user interface based on the changed display direction.

In a first embodiment, the step (S130) of setting a user interface may be reversing, by the display unit 151, the image based on the display direction to display a normal image (or the original image).

In a second embodiment, the step (S130) of setting a user interface may be changing a user interface related to the camera 121 based on the display direction. In this case, the changing of the user interface related to the camera 121 may be selectively displaying a menu provided in a general image capture mode and a menu provided in a self-image capture mode.

In a third embodiment, the step (S130) of setting a user interface may be selectively displaying images captured by the plurality of cameras 121 based on the display direction. In this case, the selectively displaying of the plurality of captured images may be selectively displaying images captured by the plurality of cameras 121 based on brightness of the images captured by the plurality of cameras 121.

In a fourth embodiment, the step (S130) of setting a user interface may be controlling the display unit 151 to selectively display the images regarding the plurality of applications being executed based on the display direction. In this case, the plurality of applications being executed may include an application being executed in the foreground and an application being executed in the background. Also, in this case, the plurality of applications being executed may include a call application and an application other than the call application.

In a fifth embodiment, the step (S130) of setting a user interface may be selectively activating the plurality of audio output modules 152 based on the display direction. Here, the plurality of audio output modules 152 may output voices received from different counterpart terminals.

In a sixth embodiment, the step (S130) of setting a user interface may be converting the coordinates of an area detected by the user input unit 130 based on the display direction.

Figure 3:
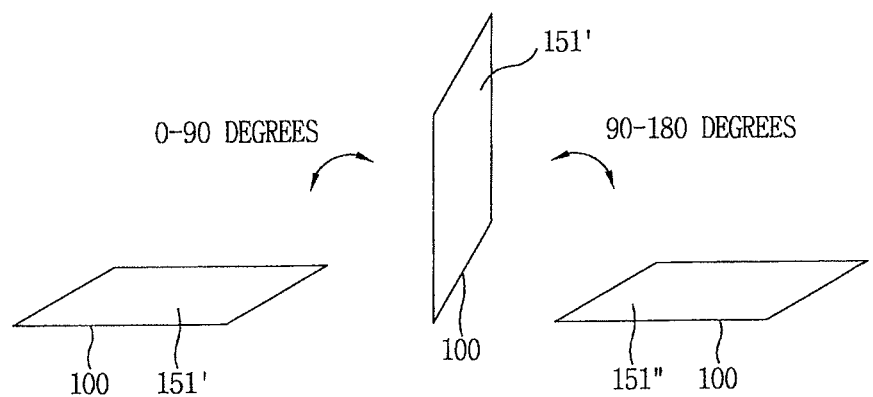
FIG. 3 is a view showing a process of determining a user's direction with respect to the mobile terminal according to an embodiment of the present invention.

FIG. 3 is a view showing a process of determining a user's direction with respect to the mobile terminal according to an embodiment of the present invention.

In the mobile terminal 100 according to embodiments of the present invention, the user's direction with respect to the mobile terminal 100 may be a user's eyes' direction with respect to a display plane (i.e., a reference display plane, e.g., the front surface or the rear surface of the body) as a reference. In detail, the mobile terminal 100 may be able to determine whether or not the user's eyes are facing the reference display plane or the opposite direction.

In order to determine a user's direction with respect to the mobile terminal 100, various methods may be used. For example, an image of the front surface may be captured by using the camera 121 provided on the same plane as the reference plane, and it is detected whether or not a body part (e.g., eyes, face, etc.) related to the user's eyes is detected from the captured image to thus determine whether or not the users' eyes are facing the reference display plane or the opposite display plane.

In another example, according to whether or not the reference display plane faces in the opposite direction (or the opposite direction of the surface of the earth), the mobile terminal 100 may determine whether or not the user's eyes face the reference display plane or the opposite display plane. Namely, in general, the user looks down at the display plane of the mobile terminal 100 in using the mobile terminal 100, so it may be determined that the user's eyes faces the reference display plane when the reference display plane faces in the opposite direction of the center of the earth.

For example, with reference to FIG. 3, the mobile terminal 100 may display an image based on the display plane facing in the opposite direction of the center of the earth. Namely, it may be assumed that the angle of the mobile terminal is 0 degree when a first display plane 151' of the mobile terminal 100 faces the opposite direction of the center of the earth and is parallel to the surface of the earth or perpendicular to the center of the earth. In this case, it may also be assumed that the angle of the mobile terminal 100 is 180 degrees when a second display plane 151", which faces in a direction opposite to the first display plane 151', faces in the opposite direction of the center of the earth and is parallel to the surface of the earth or perpendicular to the center of the earth. Also, an intermediate state between 0 degree and 180 degrees may be assumed to be 90 degrees.

In this case, in a state corresponding to 0 degree to 90 degrees, the mobile terminal 100 may display an image based on the first display plane 151', and in a state corresponding to 90 degrees to 180 degrees, the mobile terminal 100 may display an image based on the second display plane 151". When a state corresponding to 45 degrees in which an image is displayed based on the first display plane 151' is changed into a state corresponding to 135 degrees, the mobile terminal 100 may change a display direction of the image such that the image is displayed in the original direction based on the second display plane 151".

In this manner, in order to determine the user's direction with respect to the mobile terminal 100, an acceleration sensor sensing the degree of tilting of the mobile terminal 100 with respect to the surface of the earth by measuring the gravitational acceleration with respect to the earth gravity, a gyro sensor sensing turning acceleration (or angular velocity), a geomagnetic sensor detecting an azimuth angle by using magnetic field information horizontally formed on the surface of the earth, and the like. Thus, the sensing unit 141 may include at least one of the acceleration sensor, the gyro sensor, and the geomagnetic sensor.

Figure 4A:
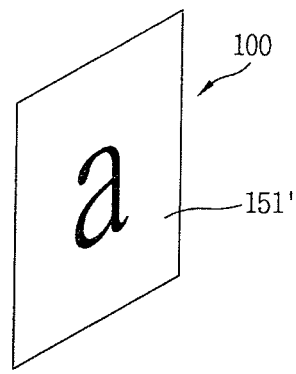
FIG. 4A to 4C are conceptual views showing operational examples of the mobile terminal according to the operation controlling method illustrated in FIG. 2.
Figure 4B:
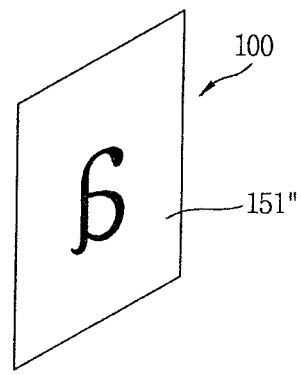
Figure 4C:
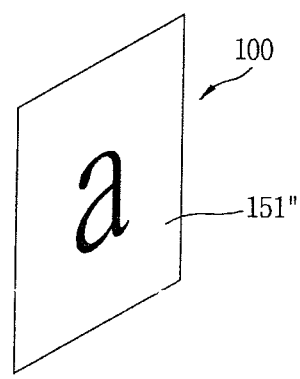

FIG. 4A to 4C are conceptual views showing operational examples of the mobile terminal according to the operation controlling method illustrated in FIG. 2.

With reference to FIG. 44A, the sensing unit 141 determines the user's direction with respect to the mobile terminal 100 by using, for example, an acceleration sensor. The controller 180 controls the display unit 151 to display an image based on the display plane 151' corresponding to the user's direction. For example, when a notification event, such as a text message, or the like, occurs in a state in which the mobile terminal 100 is placed on the bottom, an image related to the corresponding event may be displayed based on the display plane corresponding to the user's direction.

With reference to FIG. 4C, the sensing unit 141 monitors whether or not the user's direction with respect to the mobile terminal 100 is changed by using the acceleration sensor. When the angle of the mobile terminal 100 is changed to make the display plane 151" face the user, conceptually, a reversed image of the image displayed based on the display plane 151' may be displayed based on the display plane 151".

With reference to FIG. 4C, when the angle of the mobile terminal 100 is changed to make the display plane 151" face the user, the controller 180 changes a display direction of the image. Accordingly, the display unit 151 may display a reversed image of the displayed image based on the display plane 151', and accordingly, the image which has been displayed based on the display plane 151' in the FIG. 44A can be continuously displayed based on the display plane 151".

By processing the image in this manner, the user can continuously view a desired image (image in the correct direction) regardless of the direction of the mobile terminal 100 in the mobile terminal including the transparent display. In a different embodiment, when a user's direction with respect to the mobile terminal is changed, the mobile terminal 100 may display the original image through a display provided on the opposite display plane, rather than reversing the image and displaying it through a display provided on the same display plane.

Figure 5A:
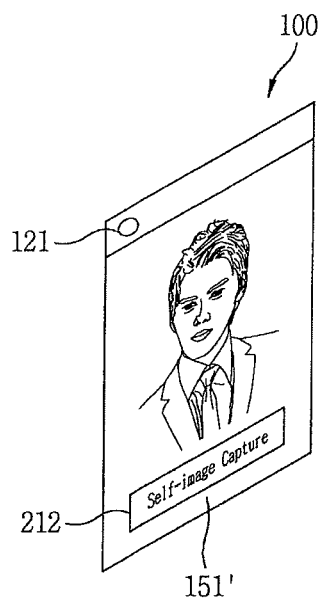
FIGS. 5A and 5B are conceptual views showing another operational examples of the mobile terminal according to the operation controlling method illustrated in FIG. 2.
Figure 5B:
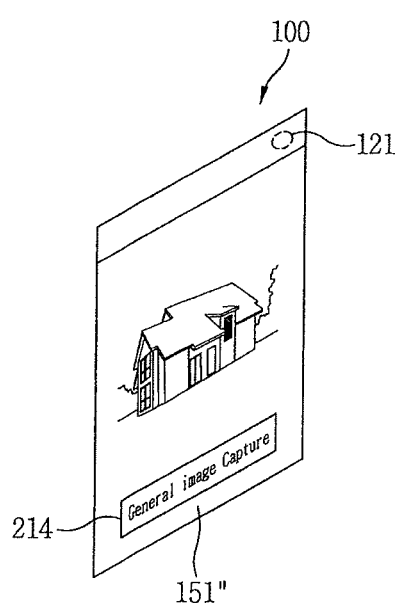

FIGS. 5A and 5B are conceptual views showing other operational examples of the mobile terminal according to the operation controlling method illustrated in FIG. 2.

With reference to FIGS. 5A and 5B, the mobile terminal may include the camera 121 on the display plane 151', and may not include the camera 121 on the display plane 151". Namely, the mobile terminal 100 may include only one camera.

With reference to FIG. 5A, when the display plane 151' faces the user, the mobile terminal 100 may enter a self-image capture mode and display a menu 212 related to self-image capturing.

With reference to FIG. 5B, when the mobile terminal 100 is turned over so the display plane 151" faces the user, the mobile terminal 100 may enter a general image capture mode and display a menu 214 related to general image capturing.

Conversely, when the display plane 151" faces the user, the mobile terminal 100 may enter the general image capture mode, and when the mobile terminal 100 is turned over so the display plane 151' faces the user, the mobile terminal 100 may enter the self-image capture mode. If only any one of image capture modes exists, for example, if only the general image capture mode exists and the self-image capture mode does not exist, the image display direction may be exceptionally maintained. In this case, a captured image may be displayed on the opposite display plane of the display plane on which the camera 121 is provided regardless of the user's direction with respect to the mobile terminal 100.

Figure 6A:
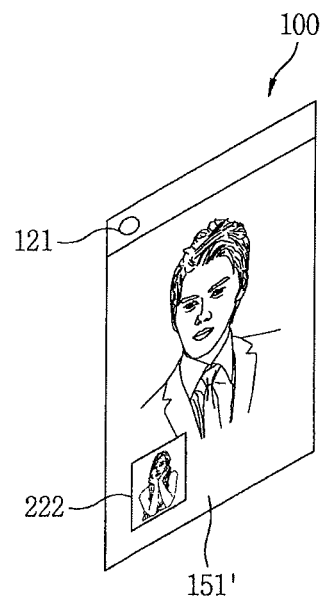
FIGS. 6A and 6B are conceptual views showing another operational examples of the mobile terminal according to the operation controlling method illustrated in FIG. 2.
Figure 6B:
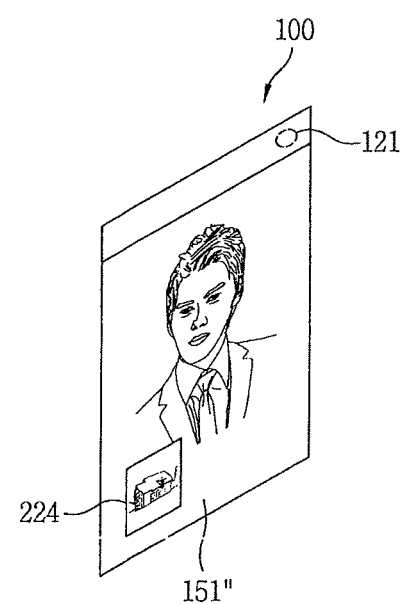

FIGS. 6A and 6B are conceptual views showing other operational examples of the mobile terminal according to the operation controlling method illustrated in FIG. 2.

With reference to FIGS. 6A and 6B, the mobile terminal 100 may include the camera 121 on the display plane 151', and may not include the camera 121 on the display plane 151". Namely, the mobile terminal 100 may include only one camera.

With reference to FIG. 6A, when the display plane 151' faces the user during video call communication, the mobile terminal 100 may transmit a self-captured image 222 of the user captured by the camera 121 in real time to a counterpart terminal and display the same on the display unit 151.

With reference to FIG. 6B, when the display plane 151" faces the user during video call communication, the mobile terminal 100 may transmit a general captured image 224 of a subject other than the user captured by the camera 121 in real time to the counterpart terminal and display the same on the display unit 151.

Figure 7A:
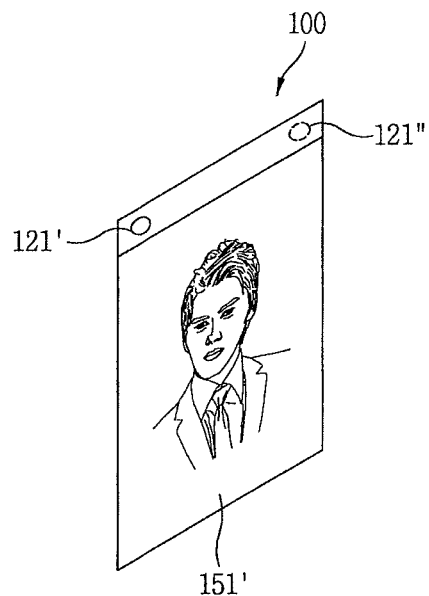
FIGS. 7A and 7B are conceptual views showing another operational examples of the mobile terminal according to the operation controlling method illustrated in FIG. 2.
Figure 7B:
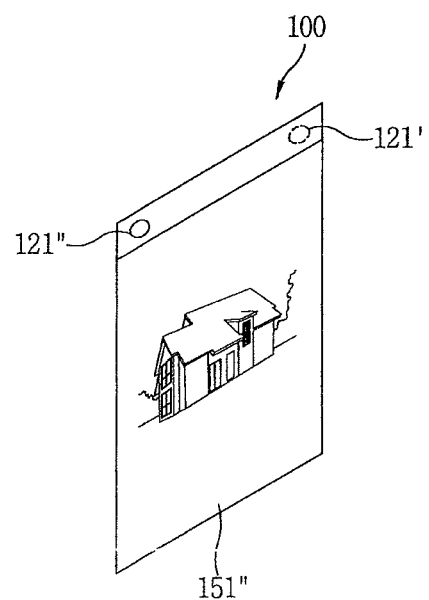

FIGS. 7A and 7B are conceptual views showing other operational examples of the mobile terminal according to the operation controlling method illustrated in FIG. 2.

With reference to FIGS. 7A and 7B, the mobile terminal 100 may include a first camera 121' on the display plane 151', and may include a second camera 121" on the display plane 151". Namely, the mobile terminal 100 may include a plurality of cameras.

With reference to FIG. 7A, when an application related to a camera is executed and the display plane 151' faces the user, the mobile terminal may enter the self-image capture mode for capturing an image of a subject including the user by using the first camera 121'.

With reference to FIG. 7B, when the display plane 151" faces the user, the mobile terminal may enter the general image capture mode for capturing a subject other than the user by using the first camera 121'.

Namely, the mobile terminal 100 may determine activation of each camera based on the user's direction with respect to the mobile terminal 100 at a point in time when the application related to a camera is executed (or at a point in time when a camera starts to be activated).

Figure 8A:
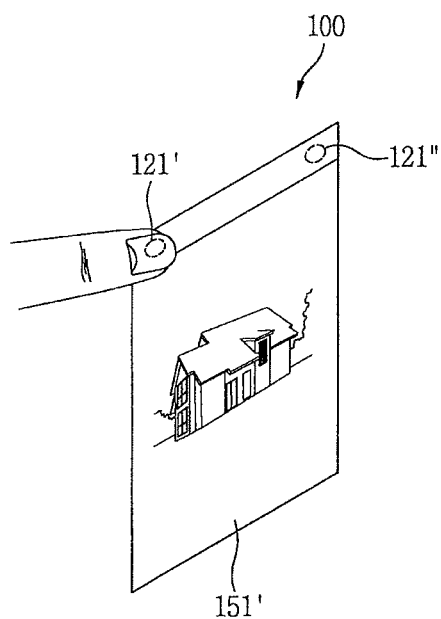
FIGS. 8A and 8B are conceptual views showing another operational examples of the mobile terminal according to the operation controlling method illustrated in FIG. 2.
Figure 8B:
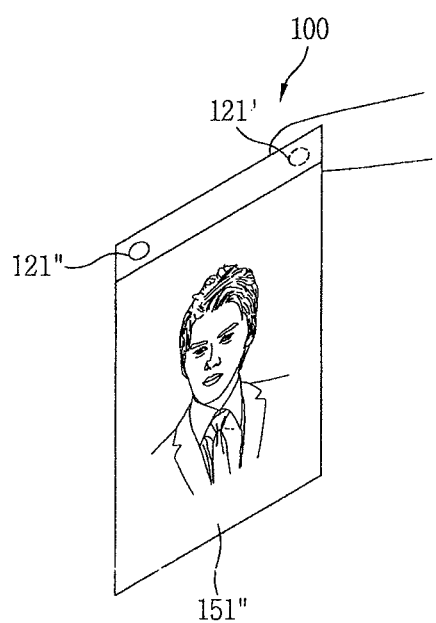

FIGS. 8A and 8B are conceptual views showing other operational examples of the mobile terminal according to the operation controlling method illustrated in FIG. 2.

With reference to FIGS. 8A and 8B the mobile terminal 100 may include the first camera 121' on the display plane

151' and the second camera 121" on the display plane 151". Namely, the mobile terminal 100 may include a plurality of cameras.

Also, when the application related to a camera is executed, the mobile terminal 100 may analyze brightness of each image captured by the first and second cameras 121' and 121", and, for example, when the brightness of any one of images is less than a threshold value because any one of the cameras is very closely covered the subject such as the user's finger, or the like, the mobile terminal 100 may deactivate the corresponding camera.

With reference to FIG. 8A, when the first camera 121' is covered by the user's finger so the brightness of the image captured by the first camera 121' is less than the threshold value, the mobile terminal 100 may enter the general image capture mode for capturing the subject other than the user through the second camera 121".

Also, with reference to FIG. 8B, when the first camera 121' is covered by the user's finger so the brightness of the image captured by the first camera 121' is less than the threshold value, the mobile terminal 100 may enter the self-image capture mode for capturing the user through the second camera 121".

Namely, the mobile terminal 100 may determine activation of each camera based on the user's direction with respect to the mobile terminal 100 and the brightness of the images captured by the respective cameras at a point in time when the application related to a camera is executed (or at a point in time when a camera starts to be activated).

Figure 9A:
FIGS. 9A and 9B are conceptual views showing another operational examples of the mobile terminal according to the operation controlling method illustrated in FIG. 2.
Figure 9B:
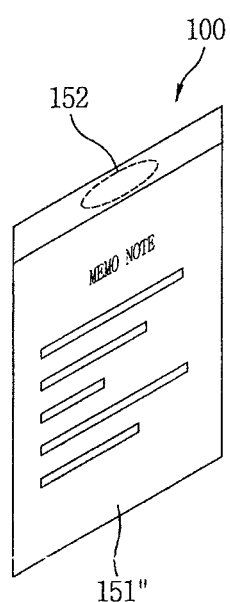

FIGS. 9A and 9B are conceptual views showing other operational examples of the mobile terminal according to the operation controlling method illustrated in FIG. 2.

With reference to FIGS. 9A and 9B, the mobile terminal 100 may have the audio output module 152 on the display plane 151' but not on the display plane 151". In this case, the audio output module 152 may be activated when the display plane 151' faces the user.

The mobile terminal 100 may support multitasking. That is, the mobile terminal may display images regarding a plurality of applications being executed based on any one of the display plane 151' and the display plane 151" to allow the user to view.

With reference to FIG. 9A, when the display plane 151' faces the user, the mobile terminal 100 may display an image related to an application (e.g., a call application) being executed in the foreground through the display plane 151' to allow the user to view. Also, when the application being executed in the foreground uses the audio output module 152 like the call application, the audio output module 152 may be activated.

With reference to FIG. 9B, when the display plane 151" faces the user, the mobile terminal 100 may display an image related to an application (e.g., an application other than the call application) being executed in the background through the display plane 151" to allow the user to view.

Namely, when the user wants to check the application being executed in the background while using the application being executed in the foreground, he may simply turn mobile terminal 100 over (or reverse the mobile terminal 100) to check the image displayed through the facing display plane. In particular, if the user starts to perform call communication with a counterpart, the mobile terminal 100 may display the application which has been executed on the opposite display plane of the display plane on which the call image is displayed, whereby the user can continue to use the application during the call communication. When the call communication is terminated, the mobile terminal may display the application on the original display plane on which it was previously displayed, thus allowing the user to seamlessly use the application.

Figure 10A:
FIGS. 10A and 10B are conceptual views showing another operational examples of the mobile terminal according to the operation controlling method illustrated in FIG. 2.
Figure 10B:
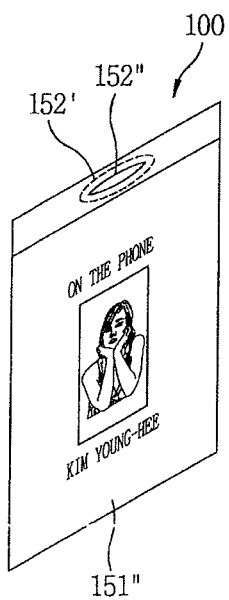

FIGS. 10A and 10B are conceptual views showing other operational examples of the mobile terminal according to the operation controlling method illustrated in FIG. 2.

With reference to FIGS. 10A and 10B, the mobile terminal 100 may include a first audio output module 152' on the display plane 151' and a second audio output module 152" on the display plane 151".

The mobile terminal 100 may support a multi-party call function allowing the user to perform call communication with a plurality of counterpart terminals. Namely, the mobile terminal 100 may display respective images regarding calls with the plurality of counterpart terminals through any one of the display plane 151' and the display plane 151" to allow the user to view.

With reference to FIG. 10A, when the display plane 151' faces the user, the mobile terminal 100 may display an image of call communication with a first terminal through the display plane 151'. Also, in this case, voice during call communication with the first terminal may be output through the audio output module 152'.

With reference to FIG. 10B, when the display plane 151" faces the user, the mobile terminal 100 may display an image of call communication with a second terminal through the display plane 151". Also, in this case, voice during call communication with the second terminal may be output through the audio output module 152".

Namely, when the user performs call communication with a plurality of counterparts, the mobile terminal changes the display direction of the image according to the user's direction so that the user can perform call communication with a desired counterpart by turning the mobile terminal over. In this case, the audio output module corresponding to the display plane on which the image is displayed may be activated.

FIG. 11A through 11D are conceptual views showing another operational examples of the mobile terminal according to the operation controlling method illustrated in FIG. 2.

With reference to FIG. 11A to 11D, the mobile terminal 100 may include a touch sensing unit on the display plane 151' but not on the display plane 151".

Figure 11A:
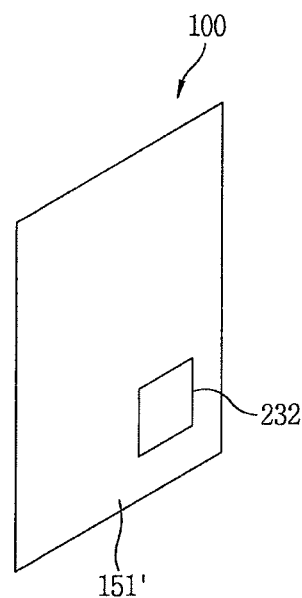
FIG. 11A through 11D are conceptual views showing another operational examples of the mobile terminal according to the operation controlling method illustrated in FIG. 2.

With reference to FIG. 11A, when the display plane 151' faces the user, a menu 232 that can be selectable through a touch input may be displayed on the display plane 151'.

Figure 11B:
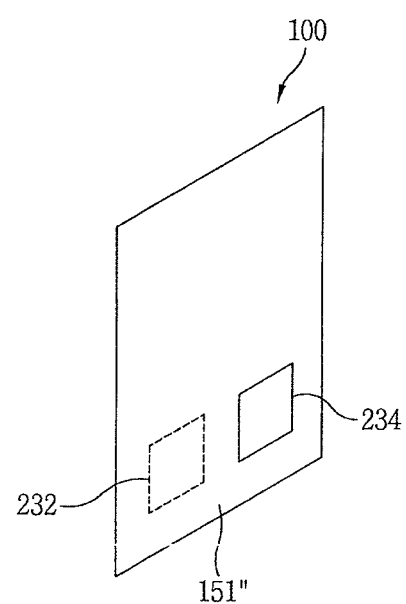
Figure 11C:
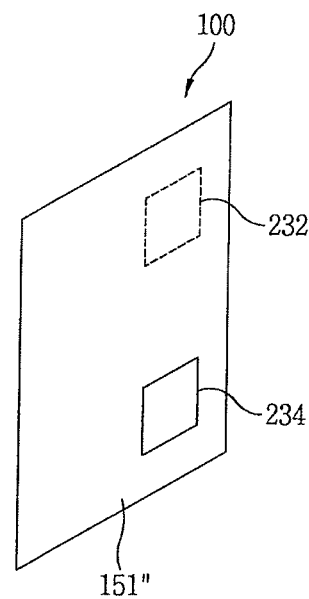
Figure 11D:
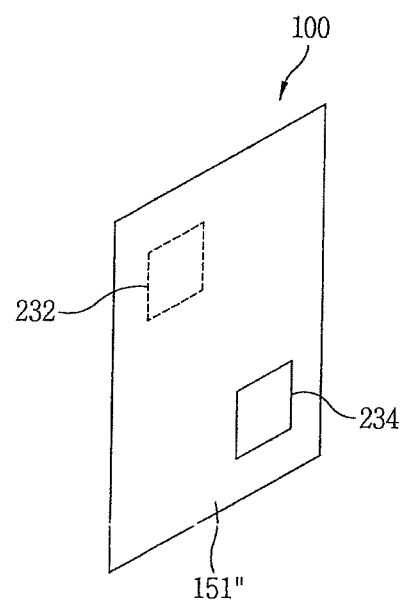

With reference to FIG. 11B through 11D, when the user turns the mobile terminal 100 over horizontally (FIG. 11B), vertically (FIG. 11C), or diagonally (FIG. 11D), the display plane 151" faces the user. In this case, a reversed image is displayed to allow the user to view the same original image, and a menu 234 that can be selectable through a touch input may be displayed. Meanwhile, since a touch input may be applied through a touch sensing unit provided on the display plane 151', so the mobile terminal 100 may change the input coordinates of the original menu 232 into input coordinates of the changed menu 234.

Then, the user may select the original menu 232 by touching a region corresponding to the coordinate-changed menu 234 through the display plane 151'.

According to an embodiment of the present invention, the mobile terminal automatically changes the display direction of an image that can be displayed on the transparent display based on the user's direction with respect to the mobile terminal, thus maximizing the utilization of the transparent display and obtain user convenience.

Also, according to an embodiment of the present invention, the mobile terminal sets a user interface related to a camera or a speaker based on the display direction of an image that can be displayed on the transparent display, thus effectively using the advantages of the double-sidedness of the transparent display.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
    a sensing unit configured to detect a user's direction with respect to the mobile terminal;
    a transparent display unit configured to display an image;
    a camera disposed on a display plane of the transparent display unit; and
    a controller configured to:
    simultaneously perform call communication with first and second counterpart terminals,
    display a first image related to the call with the first counterpart terminal on a first display plane of the transparent display unit when the user's direction is consistent with the first display plane,
    output a voice during call communication with the first counterpart terminal corresponding to the displayed first image through a first audio output module connected to the first display plane,
    detect, by the sensing unit, a change of the user's direction with respect to the mobile terminal when the mobile terminal is turned over,
    display a second image related to the call with the second counterpart terminal on a second display plane of the transparent display unit when the user's direction is consistent with the second display plane, and
    output a voice during call communication with the second counterpart terminal corresponding to the displayed second image through a second audio output module connected to the second display plane.

2. The mobile terminal of claim 1, wherein the controller is further configured to display a reversed image of the first image on the first display plane when the user's direction is consistent with the second display plane based on the detected user's direction.

3. The mobile terminal of claim 1,
    wherein the controller is further configured to control the transparent display unit to display an interface related to the camera based on the detected user's direction.

4. The mobile terminal of claim 3, wherein the controller is further configured to control the transparent display unit to selectively display a menu provided in a general image capture mode based on the detected user's direction and a menu provided in a self-image capture mode based on the detected user's direction.

5. The mobile terminal of claim 1, further comprising a plurality of cameras including the camera,
    wherein the controller is further configured to control the transparent display unit to selectively display images captured by the plurality of cameras, respectively, based on the detected user's direction.

6. The mobile terminal of claim 5, wherein the controller is further configured to control the transparent display unit to selectively display the images captured by the plurality of cameras, respectively, based on a brightness of the images.

7. The mobile terminal of claim 1, wherein the controller is further configured to control the transparent display unit to selectively display images regarding a plurality of applications being executed based on the detected user's direction.

8. The mobile terminal of claim 7, wherein the controller is further configured to control the transparent display unit to selectively display an image regarding an application being executed in a foreground based on the detected user's direction and an image regarding an application being executed in a background based on the directed user's direction.

9. The mobile terminal of claim 7, wherein the controller is further configured to control the transparent display unit to selectively display an image regarding a call application based on the detected user's direction and an image regarding an application other than the call application based on the detected user's direction.

10. The mobile terminal of claim 1, further comprising:
    wherein the controller is further configured to selectively activate the first and second audio output modules based on the detected user's direction.

11. The mobile terminal of claim 1, wherein the sensing unit includes at least one of an acceleration sensor, a gyro sensor, and a geomagnetic sensor.

12. A method for controlling an operation of a mobile terminal having a transparent display unit and a camera disposed on a display plane of the transparent display unit, the method comprising:
    simultaneously performing call communication with first and second counterpart terminals;
    detecting, by the mobile terminal, a user's direction with respect to the mobile terminal;
    displaying a first image related to the call with the first counterpart terminal on a first display plane of the transparent display unit when the user's direction is consistent with the first display plane;
    outputting a voice during call communication with the first counterpart terminal corresponding to the displayed first image through a first audio output module connected to the first display plane;
    detecting a change of the user's direction with respect to the mobile terminal when the mobile terminal is turned over;
    displaying a second image related to the call with the second counterpart terminal on a second display plane of the transparent display unit when the user's direction is consistent with the second display plane; and
    outputting a voice during call communication with the second counterpart terminal corresponding to the displayed second image through a second audio output module connected to the second display plane.

* * * * *